United States Patent
Lundkvist et al.

(10) Patent No.: US 12,535,820 B2
(45) Date of Patent: Jan. 27, 2026

(54) NAVIGATING A ROBOTIC MOWER WITH DEAD RECKONING

(71) Applicant: Greenworks (Jiangsu) Co., Ltd., Changzhou (CN)

(72) Inventors: André Lundkvist, Habo (SE); Daniel Truong, Torshälla (SE); Jonas Ahnstroem, Joenkoeping (SE)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 315 days.

(21) Appl. No.: 18/299,054

(22) Filed: Apr. 12, 2023

(65) Prior Publication Data

US 2023/0244243 A1 Aug. 3, 2023

Related U.S. Application Data

(63) Continuation of application No. PCT/CN2020/121770, filed on Oct. 19, 2020.

(51) Int. Cl.
| | |
|---|---|
| *G05D 1/00* | (2024.01) |
| *A01D 34/00* | (2006.01) |
| *A01D 101/00* | (2006.01) |
| *B60L 53/36* | (2019.01) |

(52) U.S. Cl.
CPC ......... *G05D 1/0265* (2013.01); *A01D 34/008* (2013.01); *G05D 1/0268* (2013.01); *A01D 2101/00* (2013.01); *B60L 53/36* (2019.02)

(58) Field of Classification Search
CPC ... A01D 2101/00; A01D 34/008; B60L 53/36; G01C 21/12; G05D 1/0225; G05D 1/0265; G05D 1/0268; Y02T 10/70; Y02T 10/7072
See application file for complete search history.

(56) References Cited

U.S. PATENT DOCUMENTS

| | | | |
|---|---|---|---|
| 8,433,468 B2 * | 4/2013 | Johnson | A01D 34/008 701/519 |
| 8,706,339 B2 * | 4/2014 | Thompson | G01S 5/0205 318/587 |
| 8,942,862 B2 | 1/2015 | Markusson | |
| 9,026,299 B2 * | 5/2015 | Johnson | G05D 1/0265 356/138 |
| 9,538,702 B2 * | 1/2017 | Balutis | G05D 1/0221 |

(Continued)

FOREIGN PATENT DOCUMENTS

| | | |
|---|---|---|
| DE | 202010008800 U1 | 1/2012 |
| WO | 2019153133 A1 | 8/2019 |
| WO | 2020143972 A1 | 7/2020 |

*Primary Examiner* — Kito R Robinson
*Assistant Examiner* — Rose Ridder

(57) ABSTRACT

A method navigates a robotic mower (2) comprising at least one sensor (12; 14). The method comprises detecting (S101), by means of the at least one sensor (12, 14), at least one signal from a wire (8) as a first signal source; controlling (S106) the robotic mower (2) to follow the wire (8) at a first distance (D1) to the wire (8); detecting (S108), by means of the at least one sensor (12, 14), at least one signal from a second signal source; detecting (S109) a second distance (D2) based on the at least one signal from the second signal source; and navigating (S110) the robotic mower (2) along a path determined based on the first distance (D1) and the second distance (D2).

19 Claims, 12 Drawing Sheets

(56) References Cited

U.S. PATENT DOCUMENTS

| | | | |
|---|---|---|---|
| 12,185,663 B2* | 1/2025 | Juel | G05D 1/0278 |
| 2011/0234153 A1 | 9/2011 | Abramson | |
| 2017/0347521 A1* | 12/2017 | Tjernberg | G05D 1/0265 |
| 2020/0042008 A1* | 2/2020 | Strandberg | A01D 69/02 |
| 2023/0030855 A1* | 2/2023 | Lundkvist | G05D 1/0265 |

* cited by examiner

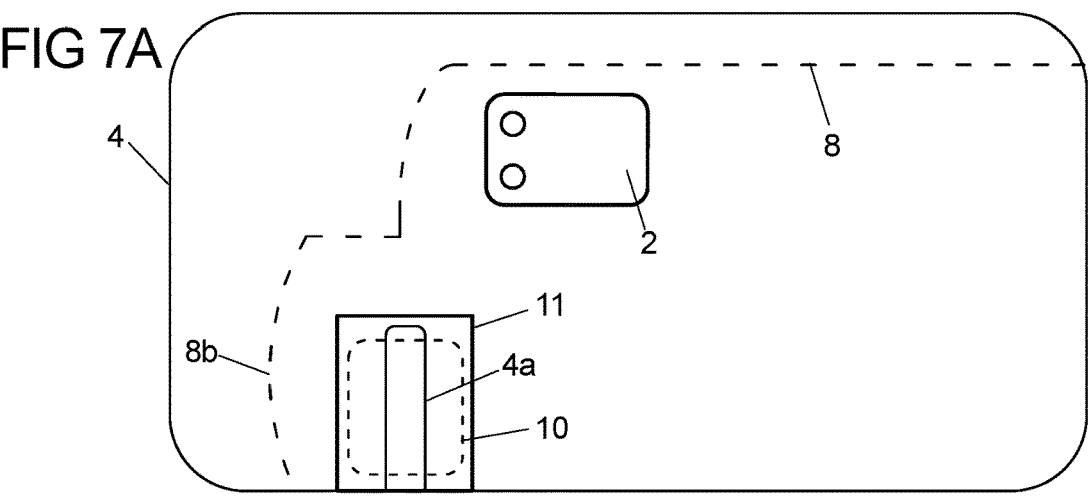
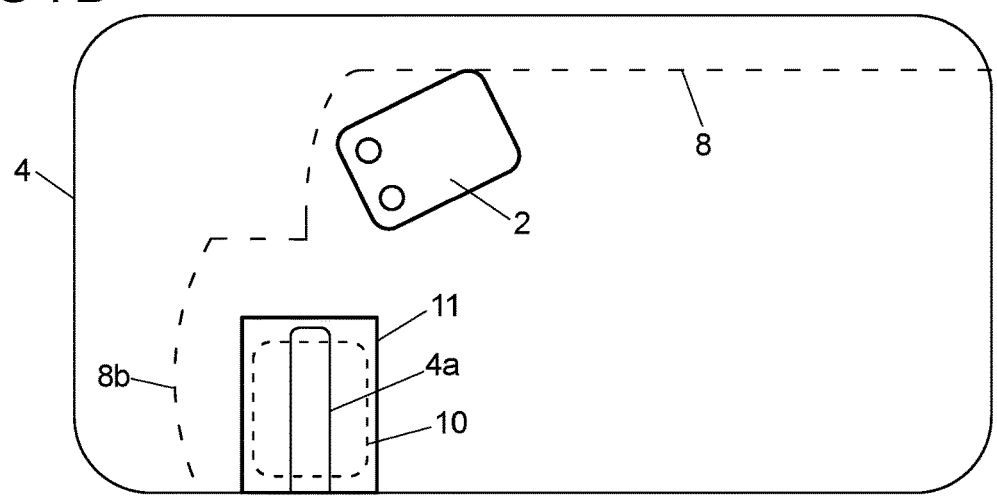
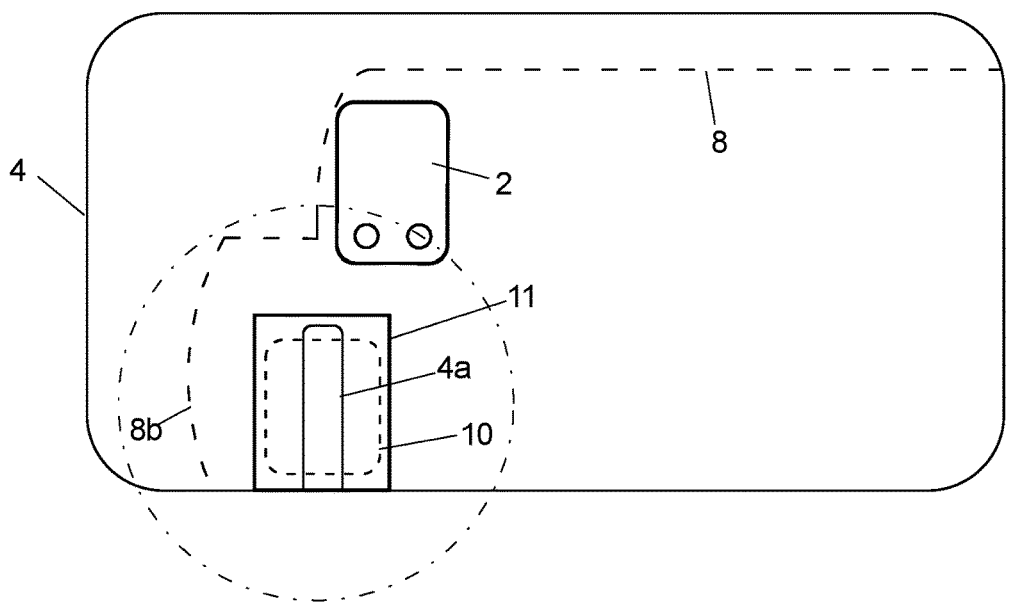

NAVIGATING A ROBOTIC MOWER WITH DEAD RECKONING

TECHNICAL FIELD

The present invention generally relates to a method for navigating a robotic mower, e.g., back to a charging station when a battery of the robotic mower needs to be recharged.

BACKGROUND ART

Robotic mowers, also called self-propelled lawnmowers, are generally known. These robotic mowers are provided with a rechargeable battery. When the remaining power in the battery is below a certain level the robotic mower is programmed to return to the charging station to recharge the battery. There are different possibilities for returning the robotic mower to the charging station. One possible method is that the robotic mower, upon a command to return to the charging station, continues its movement until a boundary wire is detected and then follows the boundary wire to the charging station that is provided somewhere along the boundary wire.

Another option when returning to the charging station is to use a guide wire, which the robotic mower follows back to the charging station. The use of a guide wire often enables a shorter and faster way back to the charging station compared to following the boundary wire. The guide wire can also be beneficial to use when the robotic mower needs to navigate through a narrow passage.

One problem when following the guide wire or boundary wire is that the robotic mower can create tracks in the lawn when driving the same path multiple times. WO 2019/183907 A1 successfully addresses this by detecting, by means of at least one sensor, a signal from the guide wire and following the guide wire at a distance, wherein the distance corresponds to a given signal strength that is sensed by the at least one sensor and wherein a control unit randomly selects the signal strength each time the guide wire signal is detected.

In order to dock at the charging station, it is conceivable to sense the proximity of the charging station, and then to follow a suitable signal until the docking position is reached. However, by this the robotic mower may be guided along the same path close to the charging station every time and, in turn, this can lead to the formation of tracks in the lawn in the vicinity of the charging station. In addition, guiding the robotic mower may fail when the corresponding wire is not routed precisely in the vicinity of the charging station. Further, there usually are no alternative options for routing the wire what may lead to a low flexibility of the installation.

SUMMARY

An object of the present invention is to provide an improved method for navigating a robotic mower.

According to an aspect of the present invention this object is achieved by a method for navigating a robotic mower comprising at least one sensor, e.g., for returning the robotic mower to a charging station when the robotic mower needs to be recharged. The method comprises detecting, by means of the at least one sensor, at least one signal from a wire, the wire being a first signal source, controlling the robotic mower to follow the wire at a first distance to the wire; detecting, by means of the at least one sensor, at least one signal from a second signal source; detecting a second distance based on at least one signal from the second signal source; and navigating the robotic mower along a path determined based on the first distance and the second distance.

This is based on the idea to navigate the robotic mower using two distance values, particularly in the vicinity of a charging station, rather than using signals. By this, it is possible to variate the first and/or second distance, and/or variate the navigation of the robotic mower using the first and second distance values, in each return cycle. This allows to more efficiently avoid the formation of tracks in certain areas of the lawn and, at the same time, is not sensitive to an incorrect routing of the wire in the vicinity of the charging station, or to changes of the routing due to circumstances of a given application.

Optionally, controlling the robotic mower to move along the path determined based on the first distance and the second distance comprises determining the path based on the first distance and the second distance prior to navigating the robotic mower along the determined path. This provides a simple and robust navigation. The path may be a straight line, or it may comprise one or two arcs.

In an exemplary embodiment, the robotic mower is controlled not to follow any signal (that could be measured with the at least one sensor) while navigating the robotic mower based on the first distance and the second distance. Thus, the robotic mower can be independent of signals in the vicinity of a predetermined position, e.g., the charging station.

Further, navigating the robotic mower on the first distance and the second distance may particularly comprise dead reckoning, e.g., based on the first distance and/or the second distance. This allows to determine different paths at each of a plurality of return cycles in a robust manner.

According to an exemplary embodiment, the first distance is based on a random value. This allows to effectively avoid the formation of tracks.

Alternatively or in addition, the second distance may be based on a random value. This allows to effectively avoid the formation of tracks, too. Optionally, the second distance is based on the first distance, e.g., equal thereto.

The first and second distances may be measured in directions describing an angle with respect to one another, in particular an orthogonal angle. This allows a precise two-dimensional navigation.

According to an exemplary embodiment, navigating the robotic mower based on the first distance and the second distance comprises controlling the robotic mower to move towards a charging station. This allows to efficiently avoid the formation of tracks in the vicinity of the charging station.

Optionally, the wire comprises a section that is routed around the charging station. This allows a particularly easy installation which can be used in many circumstances.

The second signal source may be a charging station loop arranged at the charging station. The robotic mower may be adapted to detect the at least one signal from the second signal source in a predetermined distance to the charging station loop. This allows a simple setup.

The method optionally further comprises detecting, by means of the at least one sensor, at least one signal from a third signal source. The method may further comprise controlling the robotic mower to dock at the charging station based on the detected at least one signal from the third signal source.

According to yet another embodiment, the wire is a guide wire arranged within an area delimited by a boundary wire. The guide wire guides the robotic mower to a predetermined position, e.g. to the charging station and/or beyond a narrow passage.

According to an embodiment, the third signal source is a section, e.g., a loop, of the boundary wire. This allows a low number of signal generators.

Optionally, the boundary wire loop comprises two parallel wire sections. This allows a simple control using two sensors of the robotic mower sensing the polarity of the at least one signal of the boundary wire loop, which may be more robust compared to a signal strength measurement at close distances.

In an embodiment the boundary wire loop is arranged at a charging station plate of the charging station. This allows a simple installation.

According to an exemplary embodiment, the method further comprises generating a value being indicative for the second distance and calculating a signal strength based on the generated value, or using the generated value as the signal strength. Generating this value may be performed prior to the step of detecting, by means of the at least one sensor, the at least one signal from the second signal source. This value generation may comprise generating a random value. Optionally, determining the second distance based on the at least one signal from the second signal source comprises detecting, by means of the at least one sensor, at least one signal from the second signal source having the calculated signal strength. This allows a simple and robust determination that the robotic mower is in the second distance to a given point, e.g., a reference point on the charging station, e.g., the center of the front edge thereof.

Optionally, the method further comprises controlling the robotic mower to align itself with the wire, e.g., for a precise navigation.

In another exemplary embodiment, controlling the robotic mower to align with the wire comprises controlling the robotic mower to follow the wire in a first direction until detecting a straight section of the wire, and, optionally, in response to detecting a straight section of the wire, controlling the robotic mower to follow the wire in a second direction opposite the first direction. By this, the robotic mower positions itself in front of a straight-line section of the wire, so that it can precisely initially set a randomly selected distance to the wire in a predictable manner. In yet another exemplary embodiment, controlling the robotic mower to follow the wire in the second direction comprises driving a distance that can be referred to as reversing distance based on the random distance value.

The method may further comprise controlling of the robotic mower to turn by an angle with respect to a section of the (e.g., guide) wire. Thereafter, the method may comprise the step of controlling the robotic mower to increase the distance between the robotic mower and the wire by driving a distance that can be referred to as displacement distance based on a random distance value. Then, a signal level of the at least one signal from the wire is measured by means of the at least one sensor of the robotic mower. The random distance value may be used twice, first for the reversing distance, and second, for the displacement distance. Furthermore, the random distance value may be used for the calculation of the second distance. Optionally, the measured signal level may be used as a value for detecting the second distance. Optionally, the random distance value is multiplied by a first factor for calculating the reversing distance, and the random distance value is multiplied by a second factor for calculating the displacement distance. The first and second factors can be the same, or different from one another.

Another object is to provide an improved robotic mower.

According to another aspect this object is achieved by a robotic mower comprising at least one sensor, and adapted to: detect, by means of the at least one sensor, at least one signal from a wire as a first signal source, follow the wire at a first distance to the wire; detect, by means of the at least one sensor, at least one signal from a second signal source; determine a second distance based on at least one signal from the second signal source; and navigate along a path determined based on the first distance and the second distance.

Optionally, the robotic mower is adapted to perform the method of any aspect or embodiment described herein.

According to an aspect, a system is provided comprising a robotic mower of any aspect or embodiment described herein, and the wire.

By this, a method and robotic mower for navigating the robotic mower by means of a wire are provided, that reduce the risk of forming tracks in the lawn in a simple and reliable manner.

BRIEF DESCRIPTION OF DRAWINGS

The invention is now described, by way of example, with reference to the accompanying drawings, in which:

FIG. 7A to FIG. 7F show different steps when the robotic mower navigates along an alternatively routed guide wire of the robotic mower system.

DESCRIPTION OF EMBODIMENTS

In the following, a detailed description of exemplary embodiments for navigating a robotic mower according to the present disclosure will be presented.

Figure 1:
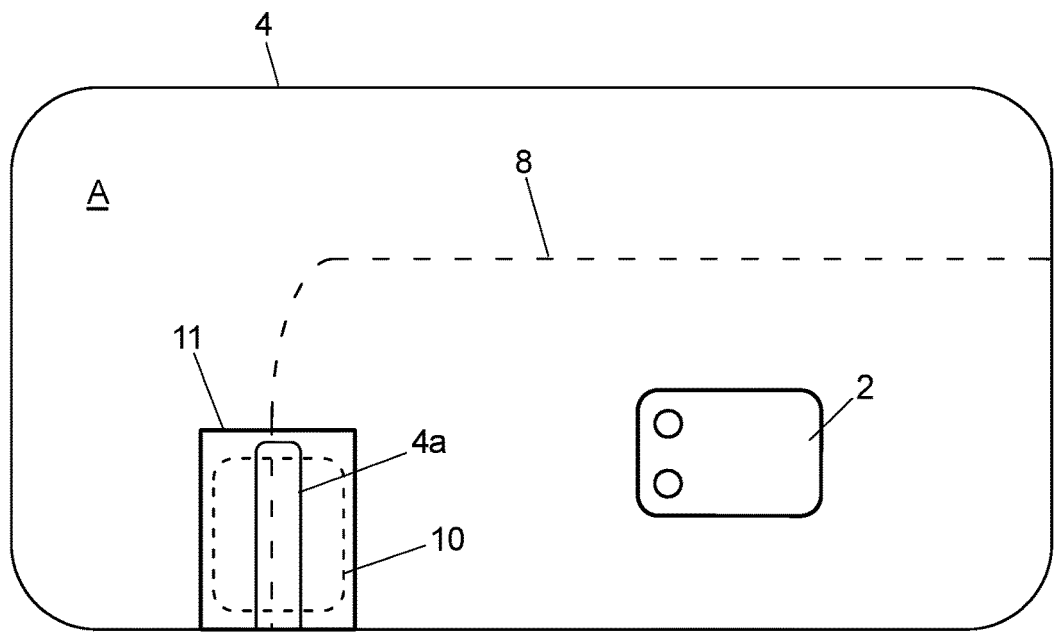
FIG. 1 a schematic view of a robotic mower system.

FIG. 1 shows a schematic overview of a system for performing the method of embodiments for navigating a robotic mower 2 by means of a guide wire 8 towards a predetermined position, such as a charging station 11. The robotic mower 2, or as it also may be called a self-propelling lawnmower, is battery powered and needs to be recharged at regular intervals. The robotic mower 2 is during operation configured to move across an area A surrounded by a boundary wire 4. As is obvious the robotic mower 2 is depicted somewhat enlarged for the sake of clarity. The boundary wire 4 may be configured in many different ways, such that it delimits the area A within which the robotic mower 2 is allowed to move. The boundary wire 4 is preferably provided under the ground in the lawn, such that is not visible, but may also be provided on or above the ground. The boundary wire 4 could be an ordinary copper wire of single-core type. There are of course also other options, which are well-known by a person skilled in the art, such as multi stranded wire types. As may be seen in FIG. 1, the boundary wire 4 makes a loop 4a in the charging station 11. This loop 4a will be used to guide the robotic mower 2 into charging contact with the charging station 11, which will be described further below.

The system also comprises the charging station 11 mentioned above. The charging station itself 11 may be seen as the place where the charging of the robotic mower 2 takes place, and could for an example be provided with a charging station plate 24 onto which the robotic mower 2 is guided when performing docketing. A charging station plate 24 (see FIG. 3) will make the docketing process more precise, since the robotic mower 2 will be at an even and predictable ground during the docketing process. In order to identify where the charging station 11 is located, there is provided a charging station loop 10 around the charging station 11. As shown in FIG. 1, the boundary wire loop 4a is narrower than and crosses the charging station loop 10.

A system according to the present disclosure also comprises one or more guide wires 8. A guide wire 8 is a wire that the robotic mower 2 may follow when returning to the charging station 11 and/or to move along a way that is otherwise difficult to find. By using a guide wire 8 it is possible to return the robotic mower 2 to the charging station 11 in a faster and less energy consuming way.

The boundary wire 4, the charging station loop 10 and the one or more guide wires 8 are all connected to a signal generator which feeds each wire and loop with an Alternating Current (AC) signal, such that the robotic mower 2 may recognize which wire or loop it is detecting when it is within sensing distance. In general, the robotic mower 2 may be adapted to detect magnetic fields of the different signal wires.

Figure 2:
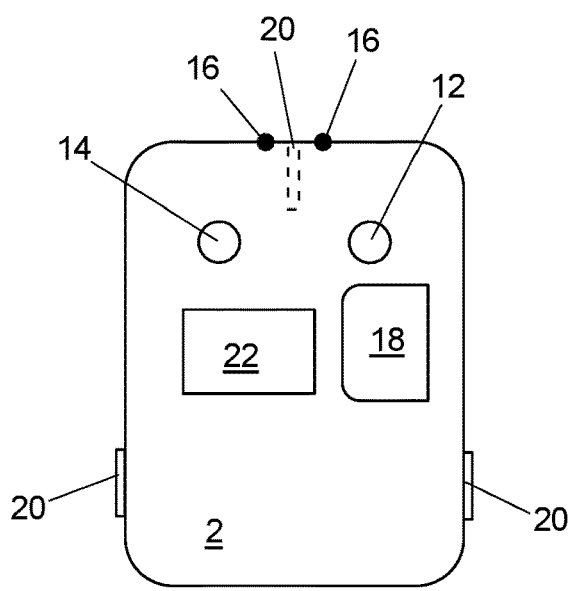
FIG. 2 is a schematic view of an exemplary embodiment of the robotic mower.

Turning now to FIG. 2, an exemplary embodiment of the robotic mower 2 will be closer described. The robotic mower 2 comprises a control unit 22, wheels 20, at least one sensor 12, 14 and a battery 18. The control unit 22, which will be closer described in conjunction with FIG. 4, comprises a processor 80 for controlling the movement of the robotic mower 2. When the robotic mower 2 is in operation, the sensors 12, 14 can sense a magnetic field that is generated in the boundary wire 4, the charging station loop 10 and the one or several guide wires 8. The sensed magnetic field (signal) is decoded in the control unit 22 to determine from which loop or wire it was received. The robotic mower 2 further comprises charging connectors 16. In the present example, the robotic mower 2 comprises exactly two sensors 12, 14, but in alternative embodiments the robotic mower 2 may comprise more than two, e.g., three or four sensors.

It is worth noting that the robotic mower 2 has a forward-rearward axis along which the robotic mower 2 moves when it drives straight ahead or straight backwards. In the present example, the robotic mower 2 has a longitudinal extension in accordance with the forward-rearward axis. The two sensors 12, 14 are arranged displaced to one another in a direction orthogonal to the forward-rearward axis. In this example, the sensors 12, 14 are arranged in a front region of the robotic mower 2 and could be referred to as front sensors 12, 14.

Figure 3:
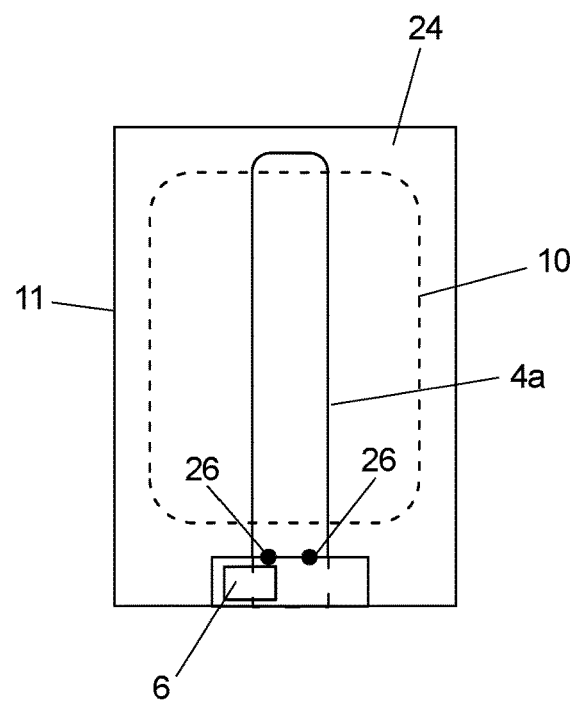
FIG. 3 is a schematic view of an exemplary embodiment of a charging station of the robotic mower system.

FIG. 3 shows an exemplary embodiment of the charging station 11. The charging station 11 comprises the charging station plate 24 at which the charging station loop 10 (which can also be referred to as far-field loop) and the boundary wire loop 4a (which may also be referred to as near-field loop) are arranged. The charging station 11 further comprises the signal generator 6. As shown in FIG. 3, the charging station 11 comprises charging connectors 26 which are arranged so as to be contacted by the charging connectors 16 of the robotic mower 2 when docking into the charging station 11.

Figure 4:
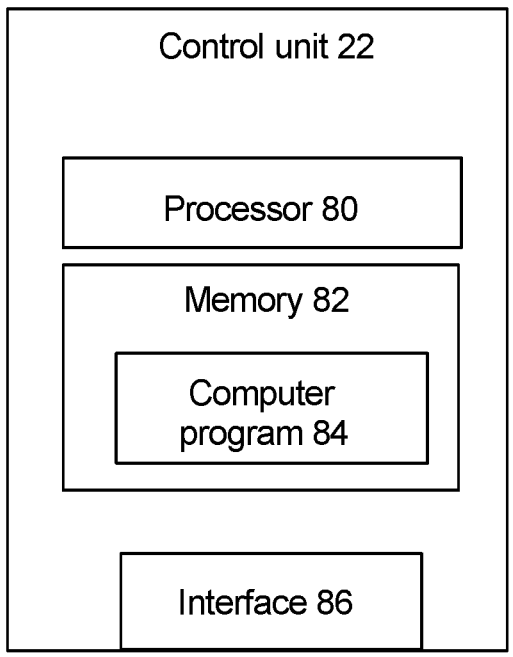
FIG. 4 is a schematic block diagram of a control unit in the robotic mower.

With reference to FIG. 4, the control unit 22 of the robotic mower 2 will be closer described. The control unit 22 comprises, as mentioned above, the processor 80 and a memory 82. The memory 82 may comprise a computer program 84 comprising computer program code, i.e. instructions. The computer program code is adapted to implement method steps performed by the robotic mower 2 when the code is executed on the processor 80. The control unit 22 further comprises an interface 86 for communication with the sensors 12, 14, and one or more motors that operate(s) the robotic mower 2.

The processor 80 may comprise a single Central Processing Unit (CPU), or could comprise two or more processing units. For example, the processor 80 may includes general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 80 may also comprise a storage for caching purposes.

Figure 5:
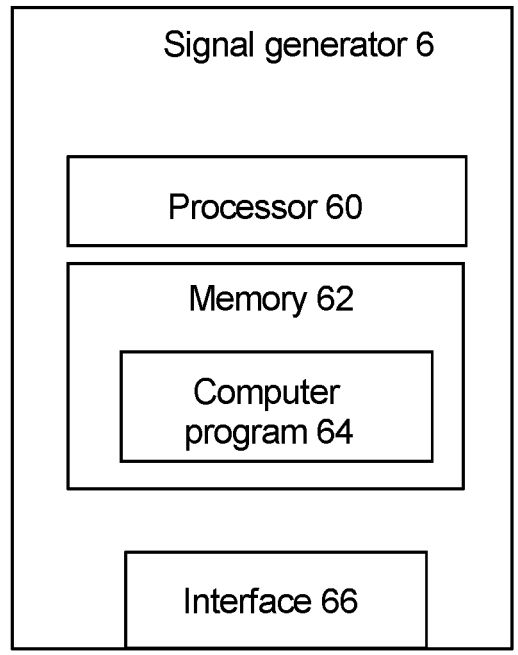
FIG. 5 is a schematic block diagram of a signal generator.

FIG. 5 depicts the signal generator 6, which also comprises a processor 60 and a memory 62. The memory 62 may comprise a computer program 64 comprising computer program code, i.e. instructions. The computer program code is adapted to implement method steps performed by the signal generator 6 when the code is executed on the processor 60. The signal generator 6 further comprises an interface 66 for transmitting the generated AC signals to the boundary wire 4, charging station loop 10 and guide wire or wires 8.

The processor 80, 60 may comprise a single Central Processing Unit (CPU), or could comprise two or more processing units. For example, the processor 60 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 60 may also comprise a storage for caching purposes.

Figure 6A:
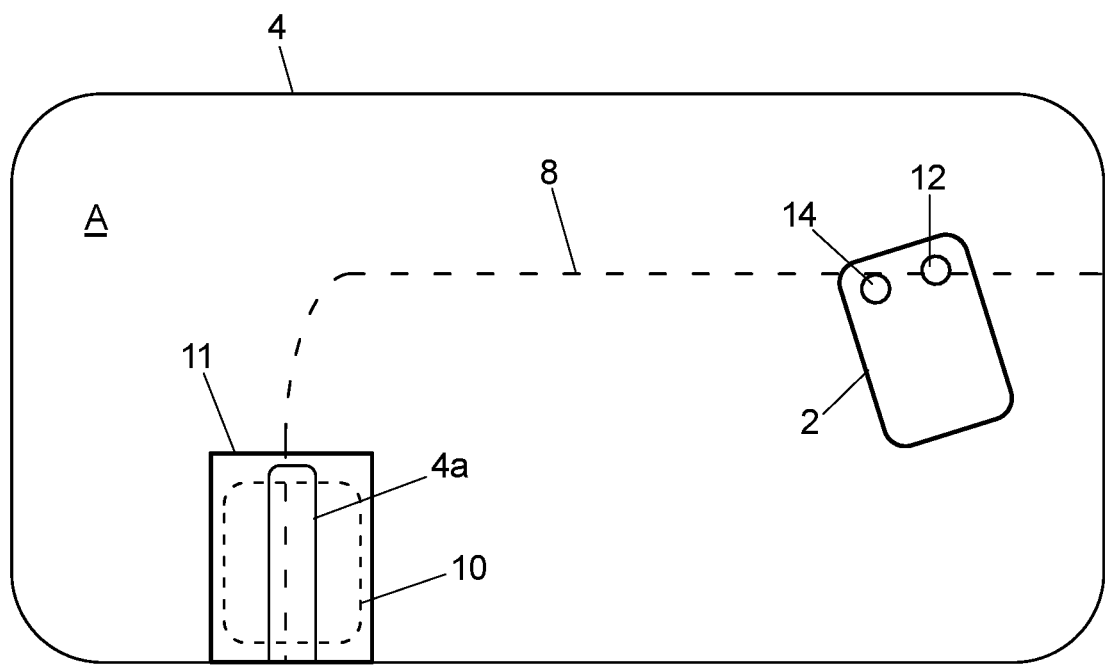
FIG. 6A to FIG. 6S show different steps when the robotic mower navigates along a guide wire of the robotic mower system.
Figure 6B:
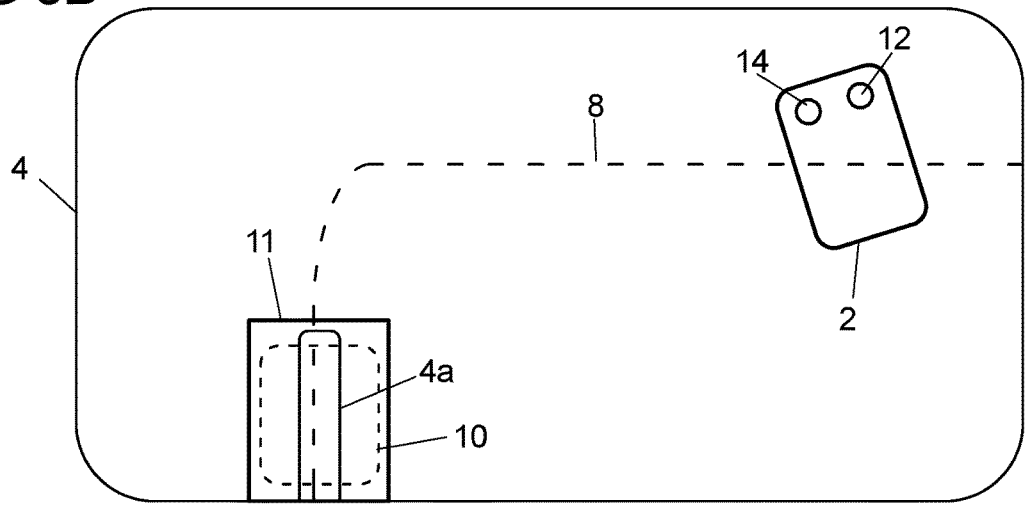
Figure 6C:
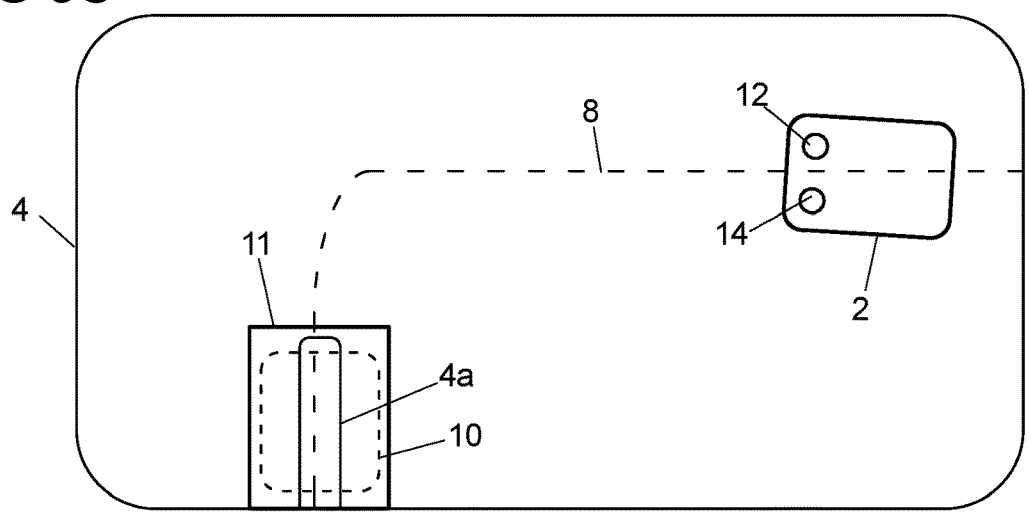
Figure 6D:
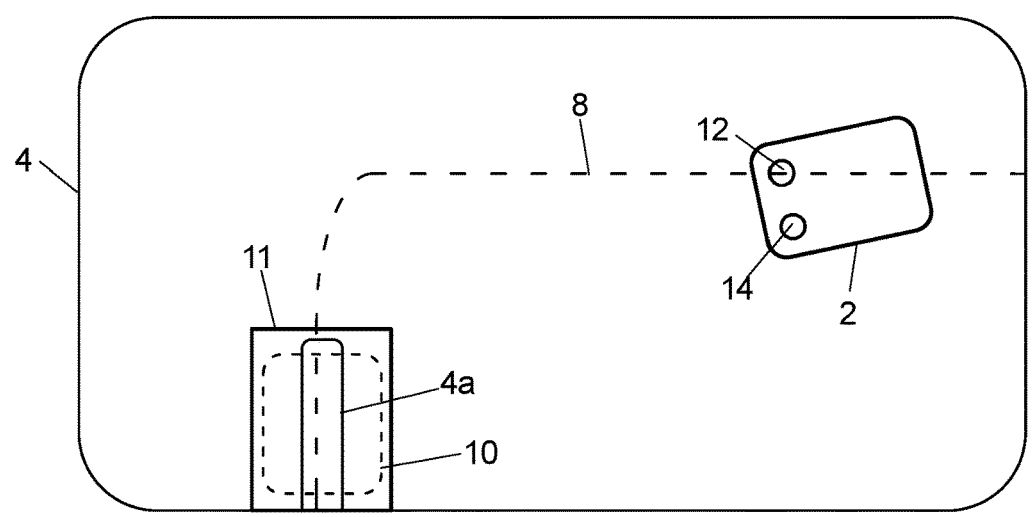
Figure 6E:
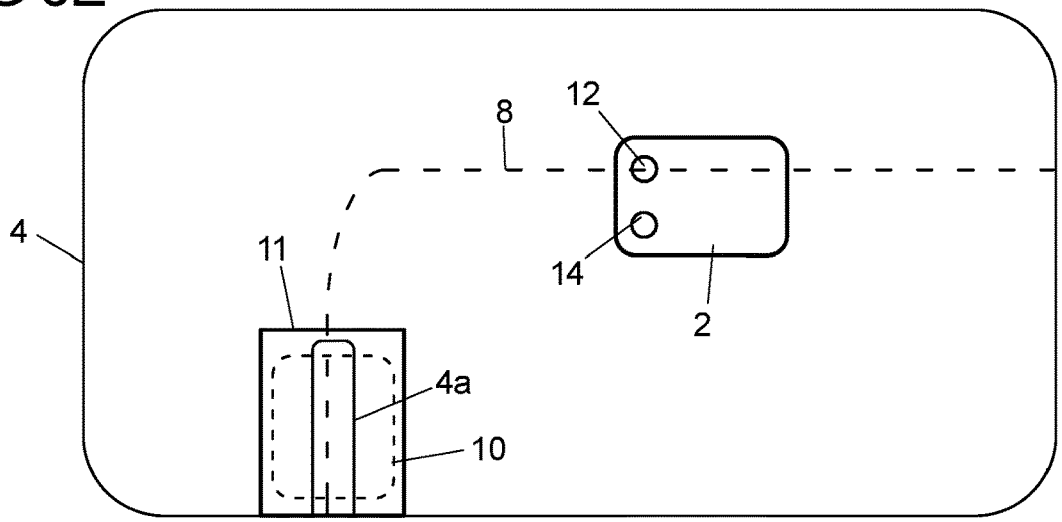
Figure 6F:
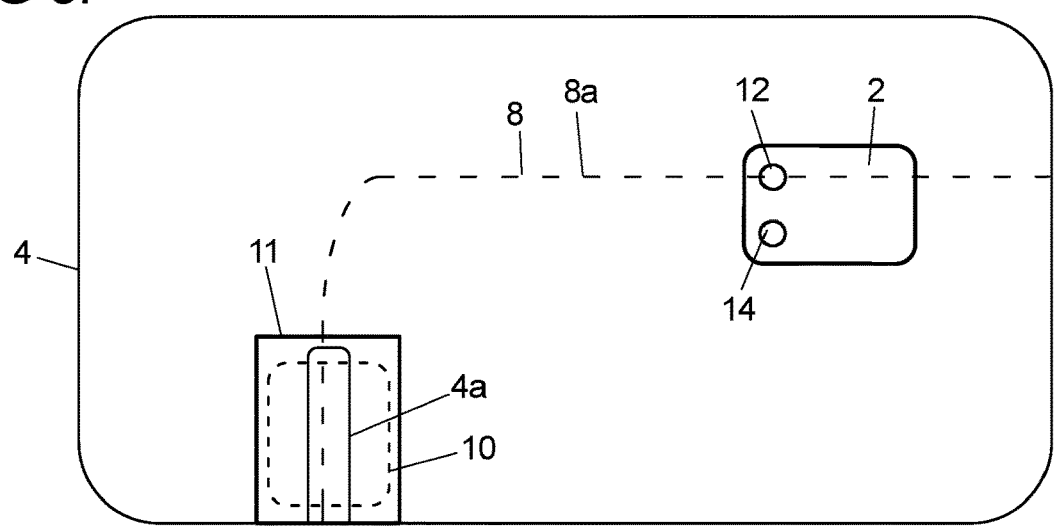
Figure 6G:
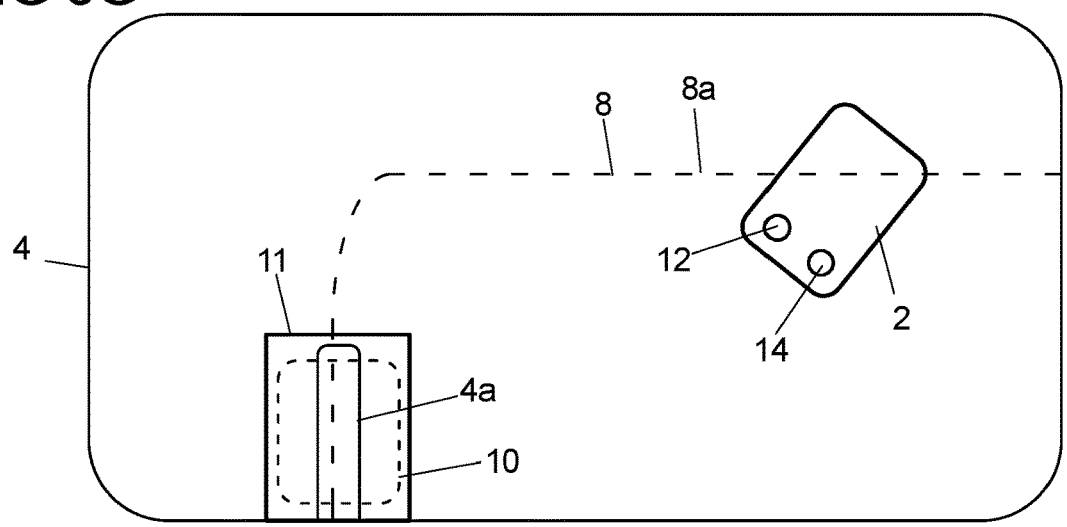
Figure 6H:
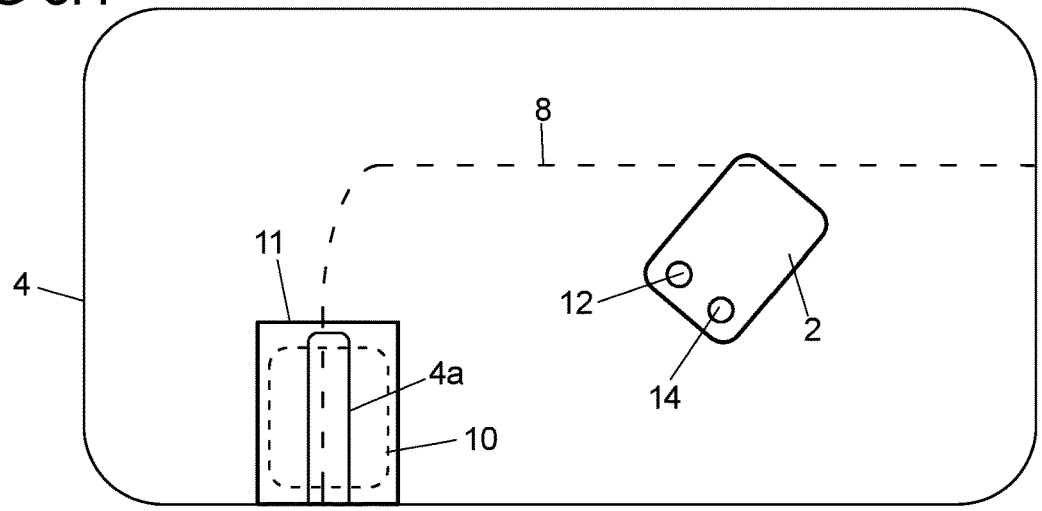
Figure 6I:
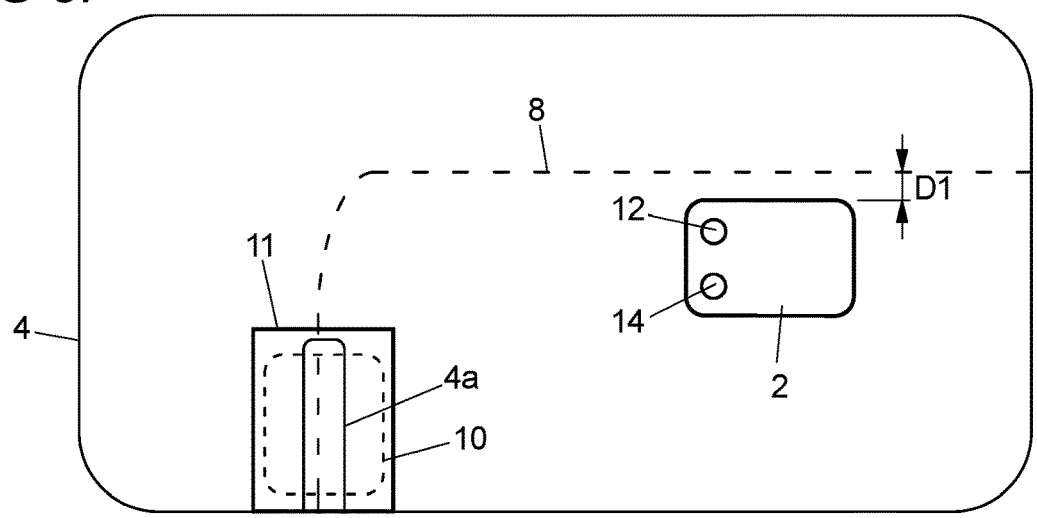
Figure 6J:
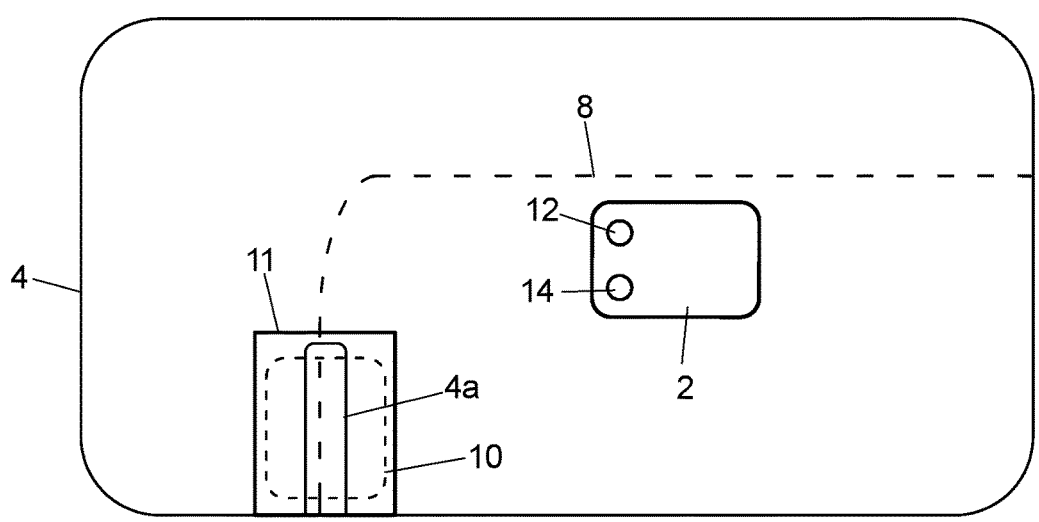
Figure 6K:
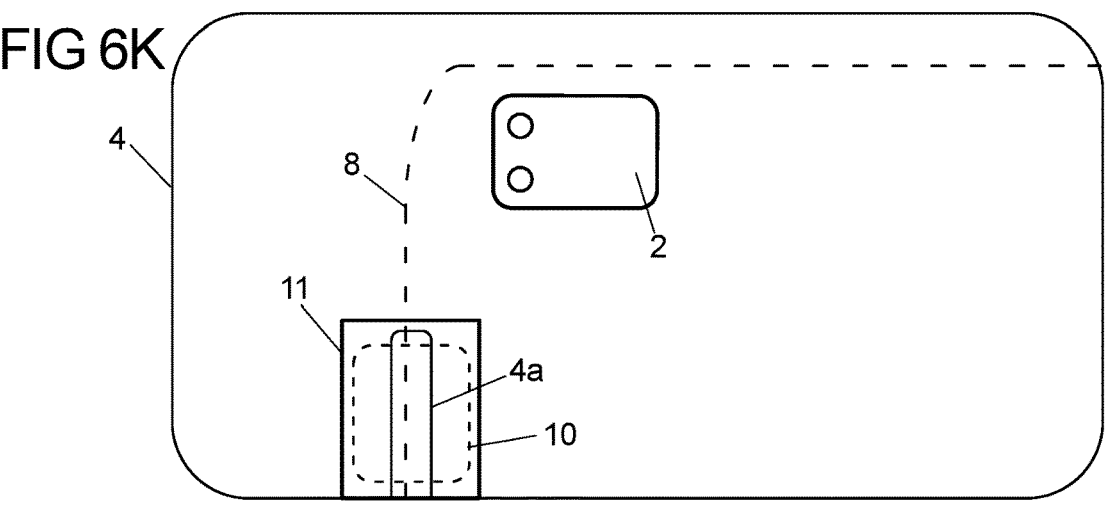
Figure 6L:
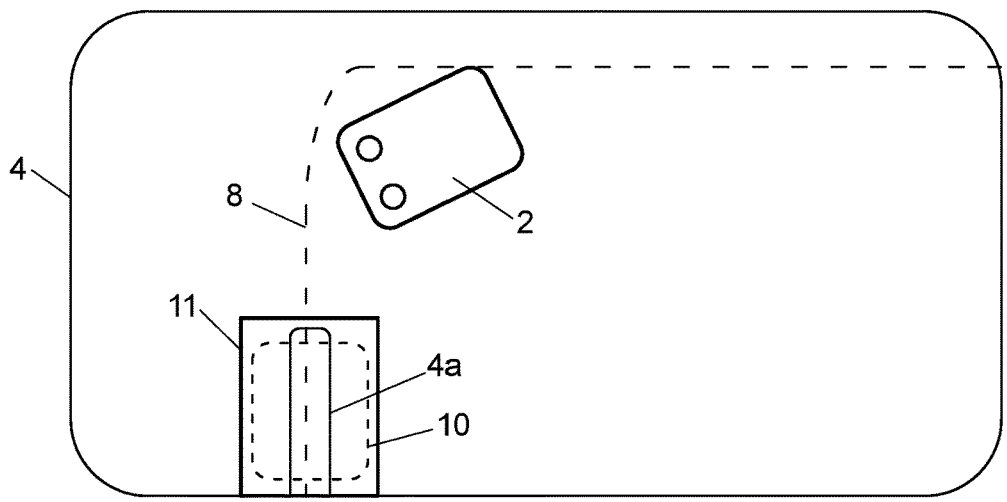
Figure 6M:
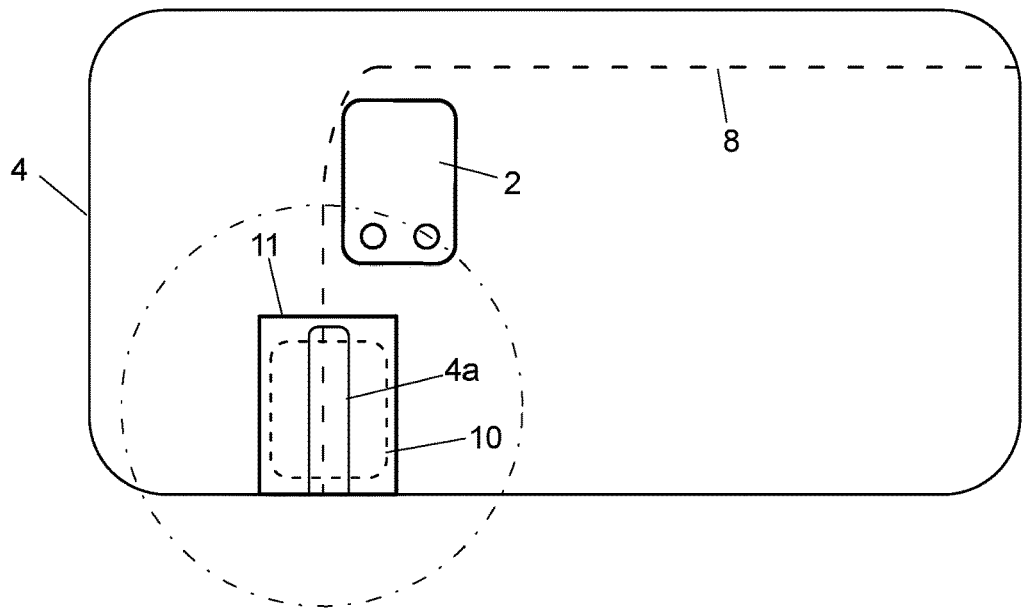
Figure 6N:
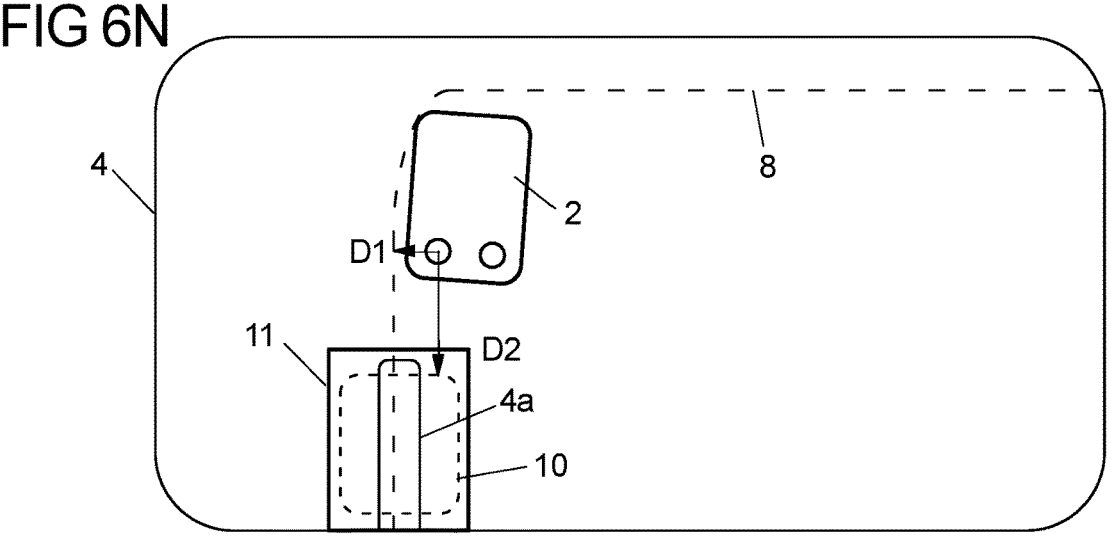
Figure 6O:
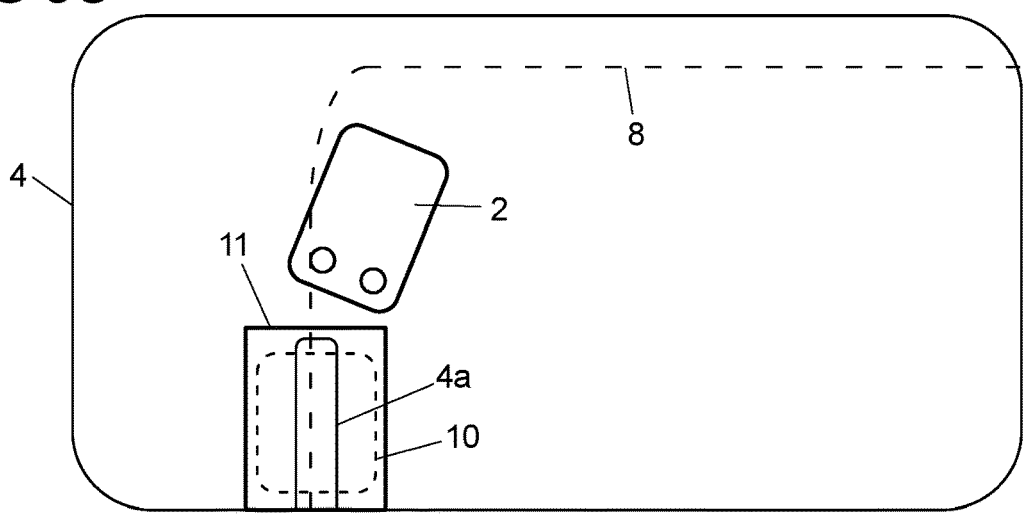
Figure 6P:
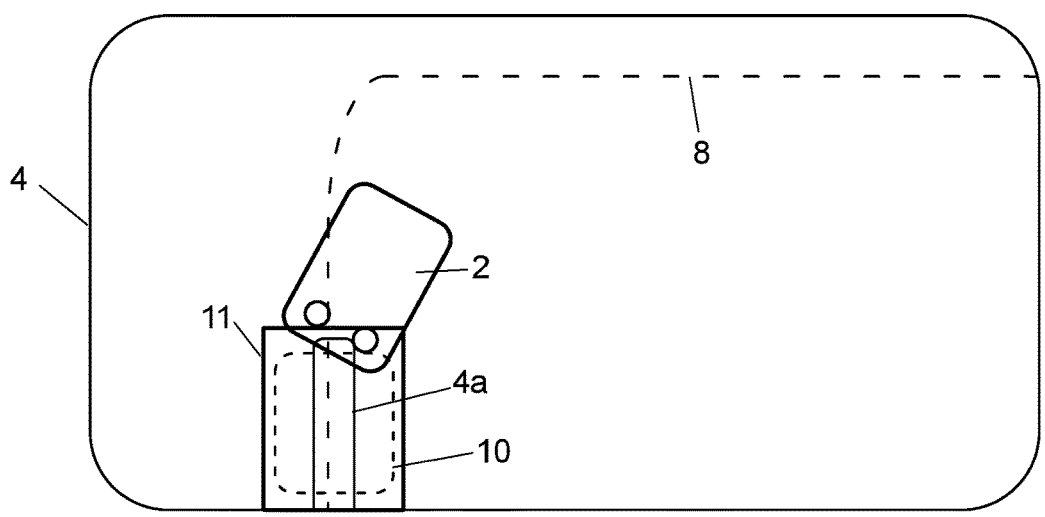
Figure 6Q:
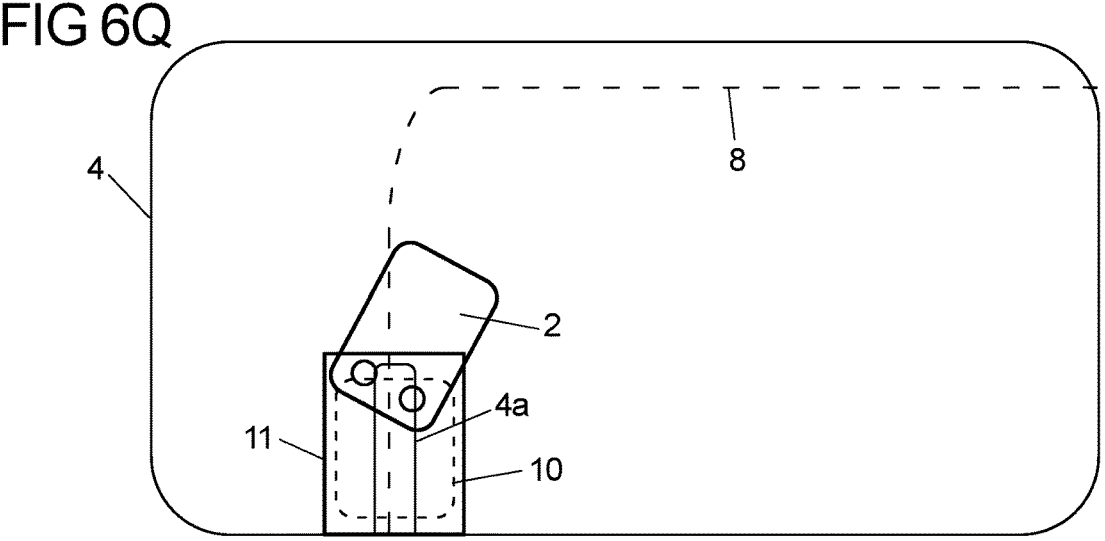
Figure 6R:
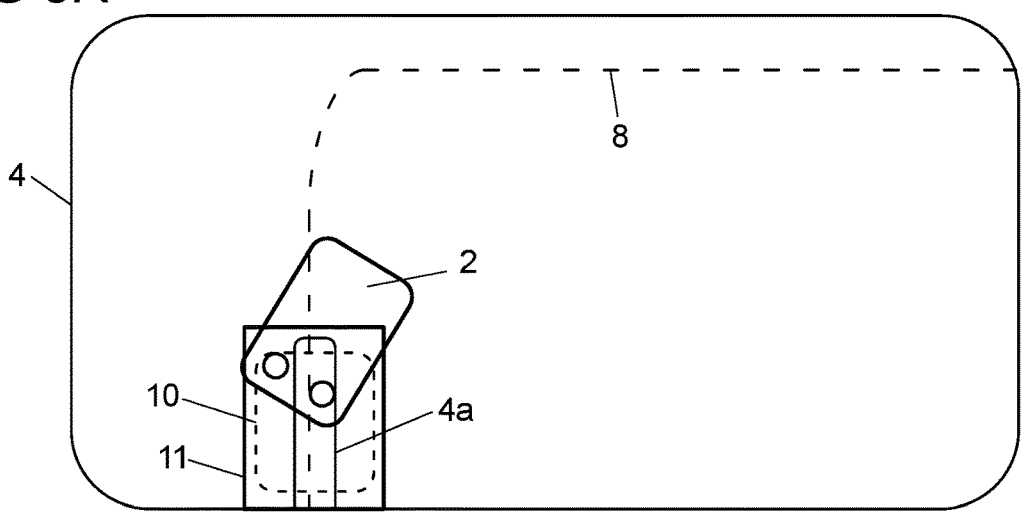
Figure 6S:
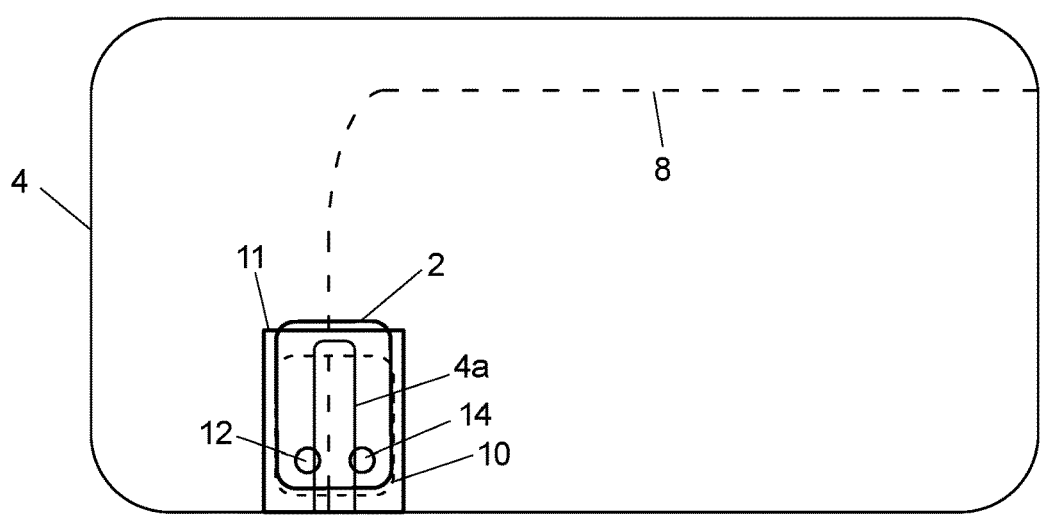

Turning now to FIG. 6A to FIG. 6S an exemplary embodiment will be closer described.

Firstly, a command is triggered, indicating that the robotic mower 2 shall be navigated towards a predetermined position, in the present example the charging station 11. The command may be triggered by the signal generator 6, or by the control unit 22. The robotic mower 2 then starts to search for the guide wire 8. For finding the guide wire 8, the robotic mower 2 drives across the area A and the sensors 12, 14 are used to listen for guide wire 8 signals. The guide wire 8 may be referred to as first signal source. The guide wire 8 signals have a range, e.g. of several meters, within which the sensors 12, 14 can sense the signals. As soon as one or both of the sensors 12, 14 receive the guide wire 8 signals, the robotic mower 2 is commanded to drive to the guide wire 8, e.g., simply by continuing to drive straight until the robotic mower 2 crosses the guide wire 8.

To create the guide wire 8 signals, the signal generator 6 directs current through the guide wire 8 which creates a magnetic field around the guide wire 8 having a polarity. Thus, on one side of the guide wire 8, the polarity of the guide wire 8 signal is opposite to the polarity at the other side of the guide wire 8. As soon as the robotic mower 2 crosses the guide wire 8, one or both of the sensors 12, 14 detect a change of the polarity. By detecting this change, the robotic mower 2, more precisely, its control unit 22, is configured to determine that it crosses the guide wire 8.

FIG. 6A shows a situation where the robotic mower 2 detects the guide wire 8. A first sensor 12 of the sensors 12, 14 has crossed the guide wire 8 while the other has not, so the robotic mower 2 can deduce that it is located directly above the guide wire 8.

In the present example, the robotic mower 2 arrived at the guide wire 8 at an angle, and in the situation shown in FIG. 6A, the first sensor 12 has crossed the guide wire 8 while the other, second sensor 14 of the sensors 12, 14 has not yet crossed it. By measuring the guide wire 8 signal polarity with the sensors 12, 14, the robotic mower 2 determines that it is directly above the guide wire 8. When the robotic mower 2 would arrive at the guide wire 8 orthogonally thereto, both sensors 12, 14 would detect a switch of the polarity at the same time, so the robotic mower 2 could deduce that it is directly above the guide wire 8 in that situation.

As shown in FIG. 6B, in response to detecting that it is located above the guide wire 8, the robotic mower 2 is adapted to drive further (in particular, straight ahead) across the guide wire 8 for a predefined distance. The predefined distance may be the length of the mower or a fraction thereof, or the turning radius of the robotic mower 2 or a fraction thereof. After driving the predefined distance, both sensors 12, 14 are arranged at the same side of the guide wire 8. Based on the guide wire 8 signal polarity, the robotic mower 2 determines the direction (along the guide wire 8) to the charging station 11. Next, the robotic mower 2 turns left or right in this determined direction of the charging station 11. While rotating relative to the guide wire 8, the robotic mower 2 analyzes the guide wire 8 signal polarity. As soon as one of the sensors 12, 14, in the figures, the left, second sensor 14, detects a change of the polarity, the robotic mower 2 determines that the guide wire 8 is substantially aligned with the robotic mower 2, in the present example, aligned with the forward-rearward axis of the robotic mower 2.

FIG. 6C shows the robotic mower 2 after aligning with the guide wire 8. The robotic mower 2 now faces the direction along the guide wire 8 towards the charging station 11.

Next, as shown in FIG. 6D, the robotic mower 2 starts to straddle the guide wire 8 with one of the sensors 12, 14 directly above the guide wire 8. In the present example, this is the right-hand side sensor 12. The other sensor 14 (here, as an example, the left-hand side sensor) is the one outside the guide loop, with in the figures is below the guide wire 8. While straddling along the guide wire 8, the robotic mower 2 searches for a straight section of the wire, in particular a straight section having a predefined length, or a length being a factor of a first distance that may also be referred to as random corridor distance D1 (described in more detail below). The robotic mower 2 may be adapted to search for a straight section of the guide wire 8 having a length, wherein the length is different run by run (wherein one run corresponds to navigate to the predetermined position once), in particular based on a random value.

FIG. 6E shows the robotic mower 2 after straddling along the guide wire 8 until it found a straight section 8a of the guide wire 8 by driving along the straight section 8a and determining that it is straight due to the fact that it did not have to make turns to follow the guide wire 8. At the straight section 8a, the guide wire 8 is routed along a straight line. After detecting the straight section 8a, the robotic mower 2 stops.

After stopping the control unit 22 of the robotic mower 2 determines the random corridor distance D1 to the guide wire 8 using a random number generator. The random corridor distance (first distance) D1 may be used as a random distance value or the random distance value may be calculated based on the random corridor distance D1. The random distance value is a measure for a length and is based on a random number. The robotic mower 2 also calculates a reversing distance based on the random distance value, e.g. by multiplying (or dividing) the random distance value by a factor, and/or using triangulation or more complex calculations. As an alternative to determining the random corridor distance D1 after stopping, the control unit 22 of the robotic mower 2 may determine the random corridor distance D1 to the guide wire 8 at a different point in time, e.g., before or while searching for a straight section of the guide wire 8, or in response to the command being triggered indicating that the robotic mower 2 shall navigate towards the predetermined position.

FIG. 6F shows that, next, the robotic mower 2 reverses and drives in the opposite direction as before along the straight section 8a of the guide wire 8 for the reversing distance. The reversing distance is shorter than or equal to the length of the straight section 8a.

Next, the robotic mower 2 turns by an angle relative to the guide wire 8. In the example according to FIG. 6G, the robotic mower 2 turns towards the outside of the guide loop of the guide wire 8. In FIG. 6G, the robotic mower 2 turns left. Here, the robotic mower 2 turns by an angle of 45 degrees. It is not necessary to follow any signal in this regard.

With reference to FIG. 6H, after turning, the robotic mower 2 drives straight forward by a displacement distance. The displacement distance is calculated by the robotic mower 2 based on the random distance value, e.g. by multiplying (or dividing) the random distance value by another factor, and/or using triangulation or more complex calculations. After driving by the displacement distance at 45 degrees to the guide wire 8, the mower is displaced to the guide wire 8 by the random corridor distance D1 to the guide wire 8. For example, the random corridor distance D1 is the closest distance between the robotic mower 2 and the guide wire 8.

The robotic mower 2 may be adapted to search for a straight section of the guide wire 8 having a length, wherein the length is based on the random corridor distance D1, and/or based on the same random number used to calculate the random corridor distance D1.

As indicated by FIG. 6I, the robotic mower 2 then stops and turns back by the angle in the opposite direction (here, 45 degrees), so as to orient in parallel with the guide wire 8. It is worth noting that for displacing the mower relative to the guide wire 8, no signal level determination is necessary. Instead, odometry is used. For determining the driving distance, in particular the displacement distance, the robotic mower 2 may control its motor(s) to operate at a given speed and count the time of driving. Alternatively or in addition, the robotic mower may count a number of rotations of a rotatable component of the drive mechanism, e.g., of a wheel 20, to determine the driven distance.

After stopping or after turning to be parallel to the guide wire 8, the robotic mower 2 determines the signal level of the guide wire signals 8, e.g., it determines the signal amplitude (e.g., samples the signal level). The robotic mower 2 then follows the guide wire 8 at this signal level. When the signal level changes while driving, e.g. due to a curve of the guide wire 8, the robotic mower 2 adapts its driving direction accordingly. Thus, the robotic mower 2 follows the guide wire at a constant distance that directly depends on the initial random number.

Each of FIGS. 6J, 6K and 6L show the robotic mower 2 after following the guide wire 8 for a certain way. The first distance D1 is same before the mower 2 detects the signal from the charging station loop 10 in one cycle, but random in different cycles, so as to avoid tracks on the lawn when the mower 2 is navigated by the guide wire 8.

FIG. 6M shows the robotic mower 2 after entering a range of charging station loop 10 signals, indicated with a dashed circle. The charging station loop 10 may be referred to as second signal source. These signals indicate to the robotic mower 2 that it is close to the charging station 11. The robotic mower 2 detects the charging station loop 10 signals with one or both sensors 12, 14, or with another sensor.

As indicated in FIG. 6N, the robotic mower 2 detects the charging station loop 10 signal at a second distance D2. The second distance D2 is e.g., randomized or determined as equal to the distance to the guide wire 8, i.e., the first distance D1 (i.e., D2=D1), or equal to the first distance D1 times a predetermined factor (i.e., D2=x*D1). D1 and D2 may be different in each return cycle. For example, first the second distance D2 and the corresponding signal strength are determined, and then the robotic mower 2 detects the charging loop 10 signal with this determined strength. Detecting the charging loop 10 signal with this determined signal strength triggers the dead reckoning. Since D2 is (optionally) different in each cycle, the dead reckoning path is also different, so that tracks can be effectively reduced. The determined signal strength may be used as a threshold to trigger the dead reckoning.

Using the first distance D1 to the guide wire and the second distance D2 to the charging station loop 10, the robotic mower 2 starts to drive to reach the charging station 11 without following any signal, i.e., with dead reckoning, see FIGS. 6O and 6P. For example, the robotic mower 2 starts to drive in a pattern and/or along a predetermined path.

Using the first and second distances D1 and D2, the robotic mower 2 can determine the distance and the angle to the center front of the charging station 11. When driving by dead reckoning, the robotic mower 2 may use odometry to determine how many degrees it has turned or how far it has driven.

The dead reckoning path may be determined, e.g., (a) using the law of cosines to calculate the angle towards the charging station 11. The robotic mower 2 may then turn by this angle and then drive straight forward until the charging station 11 is reached; or (b) by driving in a S-shape towards the charging station 11, which can be done by driving in two different arcs. The first arc could be defined by an angle (e.g., 60 degrees) in one direction (e.g., to the right) with a certain radius (e.g., D2/2). When the robotic mower 2 has turned by the angle, a second arc is defined by an angle (e.g., 60 degrees) in the other direction (e.g., to the left) with a certain radius, e.g., the same as before (e.g., D2/2). After driving the second arc, the robotic mower 2 drives straight until the charging station 11 is reached. Alternatively, the robotic mower 2 drives in an arc, e.g., 45 degrees, to one direction, e.g., the right, with a radius, e.g., equal to the first and/or second distance D1/D2. When the arc is completed, the robotic mower 2 drives straight until the charging station is reached.

The robotic mower 2 continues (e.g., the pattern) without following any signal until it enters the charging station loop 10.

Next, the robotic mower 2 detects that one or both of the sensors 12, 14 has/have entered the charging station loop 10 (e.g., by a change of the measured charging station loop 10 signal polarity), see FIG. 6Q.

The robotic mower 2 then drives forward, e.g., for a pre-determined distance, in order to arrange its front further into the charging station loop 10 and the rear wheels more aligned with the center in front of the charging station 11. The robotic mower 2 then searches for the near-field of the boundary wire loop 4a by turning until at least one (front) sensor 12, 14 is outside of the boundary wire loop 4a and inside of the charging station loop 10, see FIG. 6R.

Next, the robotic mower 2 starts docking on the charging station 11 using the boundary wire loop 4a inside the charging station plate 24. If the left sensor 14 is outside of the boundary wire loop 4a and the right sensor 12 is inside, the robotic mower 2 turns (slightly) left. If the left sensor 14 is inside of the boundary wire loop 4a and the right sensor 12 is outside, the robotic mower 2 turns (slightly) right. Otherwise the robotic mower 2 drives straight forward until the charging connectors 16, 26 come into operative connection, e.g., make electrical contact, see FIG. 6S. The guide wire 8 is routed with an offset from a center line of the charging station 11 for a precise guiding using one of the sensors 12, 14. After docking, the battery 18 of the robotic mower 2 is charged.

FIGS. 7A to 7F show the robotic mower 2 and the other components of the system of FIG. 1, but in contrast to FIG. 1, and FIGS. 6A-6S, the guide wire 8 is routed differently. In accordance with FIGS. 7A to 7F, the guide wire 8 is not routed along the longitudinal extension of the charging station 11 under the charging station 11, but it comprises a section 8b that is routed around the charging station 11. Such an arrangement is possible, because the robotic mower 2 does not rely on guide wire 8 signals anymore until it detects the far-field signal at the second distance D2, and it can be easier to install for a user in several circumstances. For example, this allows to place the charging station on solid ground on which it would not be possible to bury the guide wire 8.

Figure 7D:
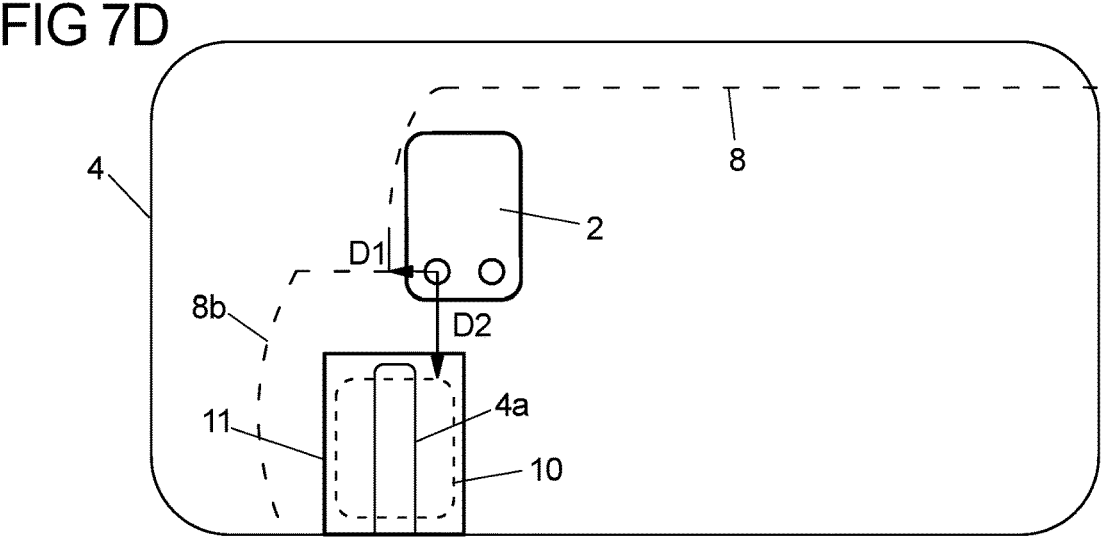
Figure 7E:
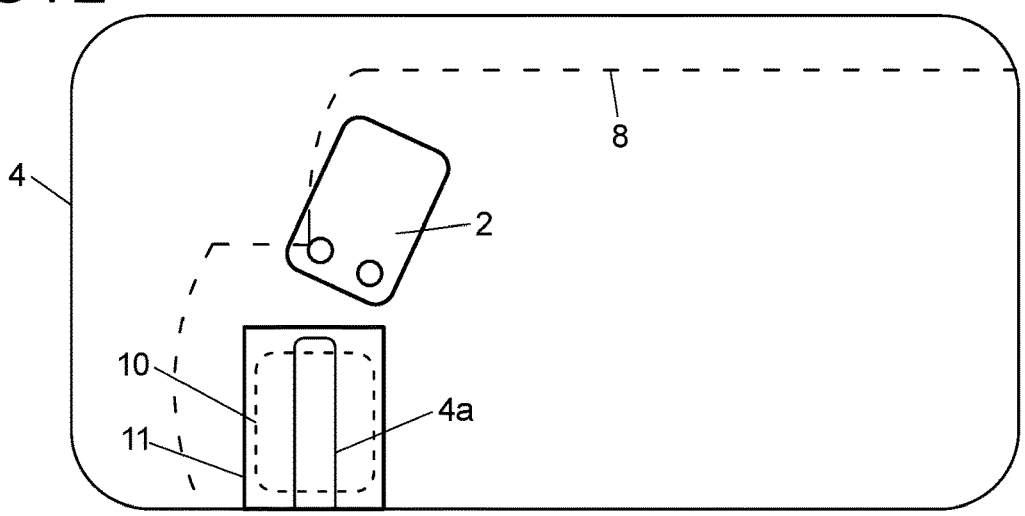
Figure 7F:
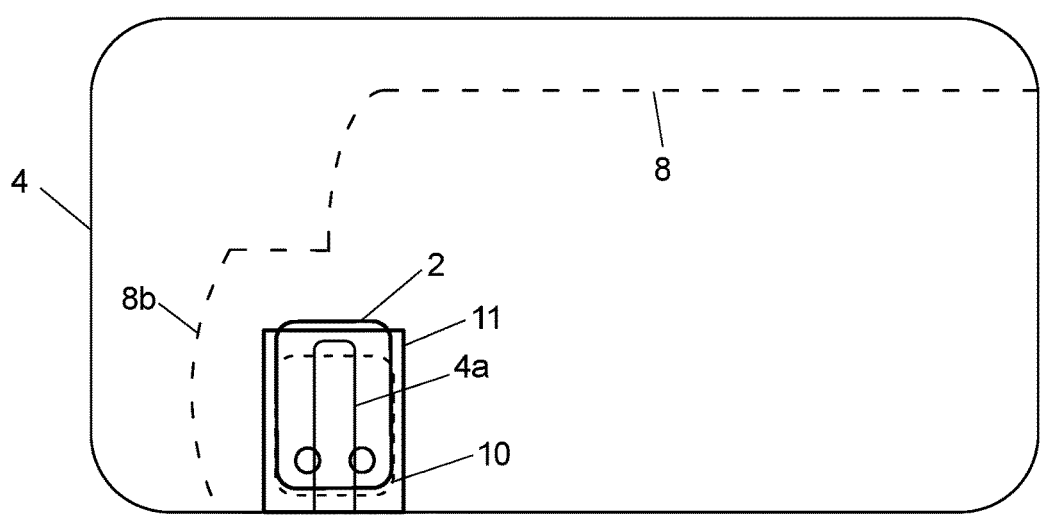

Apart of the routing of the guide wire 8, FIG. 7A corresponds to FIG. 6K, FIG. 7B to FIG. 6L, FIG. 7C to FIG. 6M, FIG. 7D to FIG. 6N, FIG. 7E to FIG. 6O, and FIG. 7F to FIG. 6P, so that reference is made to the corresponding explanations above.

Figure 8A:
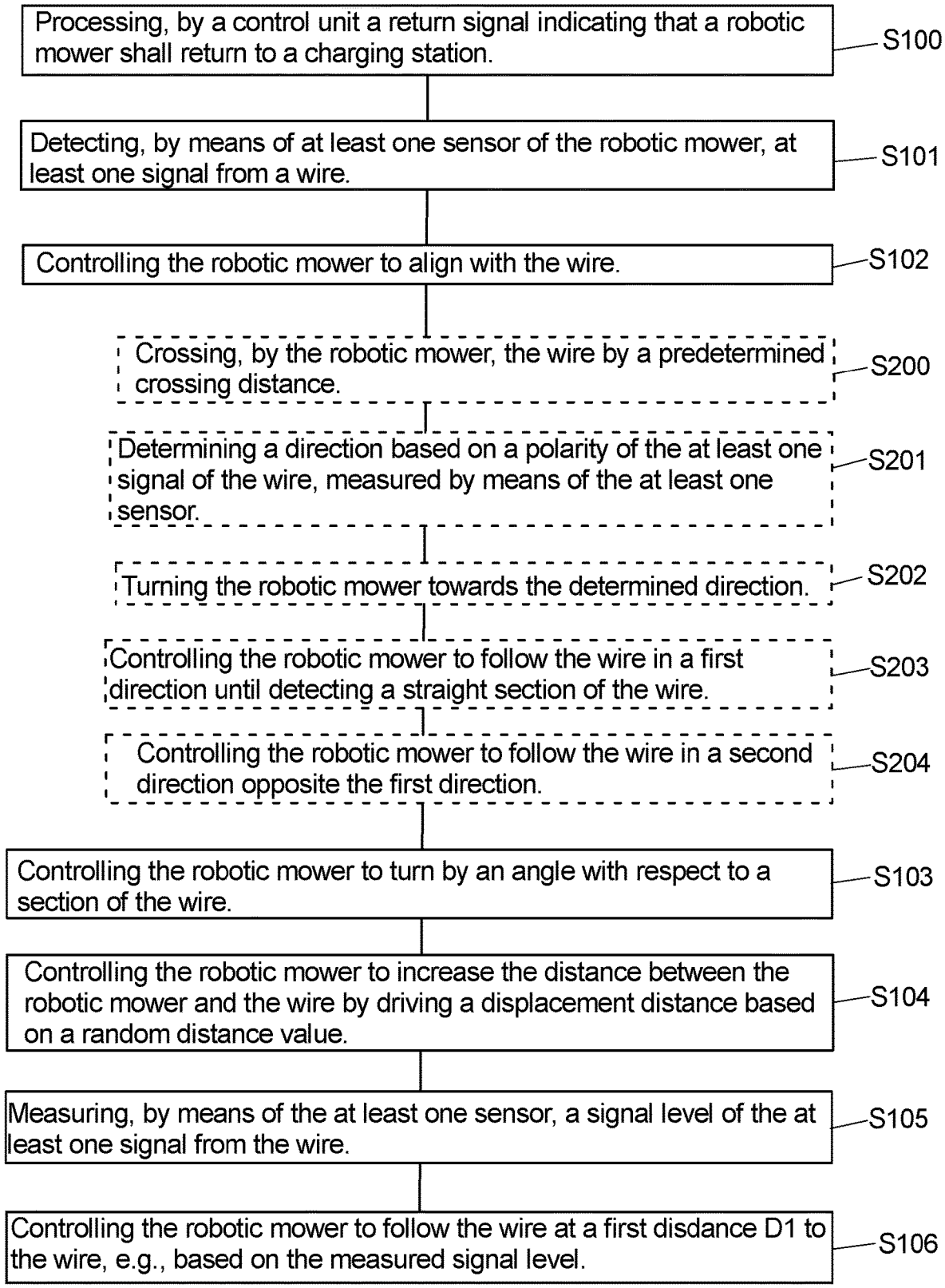
FIGS. 8A and 8B are a flow chart of an exemplary method for navigating the robotic mower by means of the guide wire.
Figure 8B:
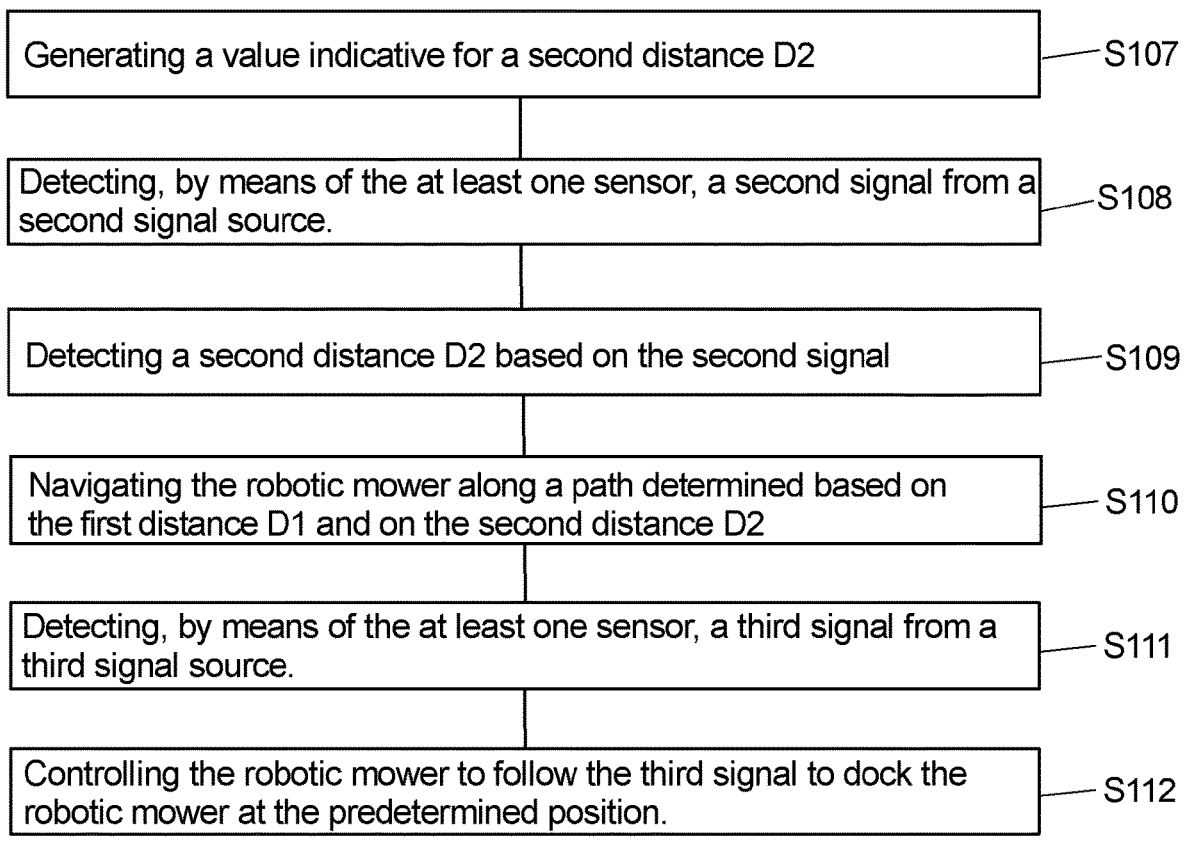

Turning now to FIGS. 8A and 8B, an exemplary method will now be described. The method may start in step S100 in which the robotic mower 2 processes, e.g. receives, a return signal at or from the control unit 22, which commands the robotic mower 2 to return to the charging station 11. Step S100 may be triggered by detecting that the power in the battery 18 is lower than a predetermined limit. The predetermined limit is set such that the robotic mower 2 may safely return to the charging station 11 before the battery 18 is empty, even if it happens to be the longest possible way back to the charging station 11.

When the robotic mower 2 has processed the command to return to the charging station 11, it commences with mowing the area A until it detects the guide wire 8 by means of one or more of the robotic mower's 2 sensors 12, 14.

At step S101, the control unit 22 detects, using the at least one sensor, at least one signal from the wire, e.g., guide wire 8, in particular, a first guiding signal, wherein the guide wire 8 is a first signal source. Thus, the control unit 22 determines that the wire or guide wire 8 is close.

Next, at optional step S102, the control unit 22 controls the robotic mower 2 to align itself with the wire, e.g., guide wire 8. For example, by aligning with the guide wire 8, the robotic mower 2 drives over the guide wire 8 and turns such that a longitudinal extension of the robotic mower 2 is oriented on the same axis as the section of the guide wire 8 below the robotic mower 2.

Optionally, aligning with the wire comprises the step S200 of crossing, by the robotic mower 2, the wire 8 by a predetermined crossing distance. Further, aligning may comprise the step S201 of determining a direction based on a polarity of the at least one signal of the guide wire 8, measured by means of the at least one sensor 12, 14. Further, aligning may comprise the step S202 of turning the robotic mower towards the determined direction. Further, turning the robotic mower 2 towards the determined direction may comprise rotating the robotic mower 2 with respect to the guide wire 8 until the two sensors 12, 14 detect the at least one signal of the guide wire 8 with opposite polarity.

The step S102 of aligning the robotic mower 2 with the guide wire 8 may comprise the step S203 of controlling the robotic mower 2 to follow the guide wire 8 in a first direction until detecting a straight-line section 8*a* of the wire 8 (e.g., having a predetermined length), and, in response to detecting the straight section 8*a* of the guide wire 8, may comprise the step S204 of controlling the robotic mower 2 to follow the guide wire 8 in a second direction opposite the first direction. For example, the first direction is the direction along the guide wire 8 towards the charging station 11, and the second direction is the direction along the guide wire 8 away from the charging station.

The method proceeds to step S103 (optional in embodiments) which comprises controlling the robotic mower 2 to turn by an angle with respect to the straight section 8*a* of the guide wire 8, e.g. by 45 degrees.

After turning by an angle, according to step S104 (optional in embodiments), the control unit 22 controls the robotic mower 2 to increase the distance between itself and the guide wire 8 by driving a displacement distance based on a random distance value, and along a straight line oriented at the angle the robotic mower turned in step S103.

Next, the method proceeds to step S105 (optional in embodiments), comprising measuring, by means of the at least one sensor, a signal level, e.g. an amplitude, of the at least one signal from the guide wire 8. Thus, after displacing itself by a certain distance, the control unit 22 samples the signal level.

Thereafter, in optional step S106, the control unit 22 controls the robotic mower 2 to follow the guide wire 8 at a first distance D1 to the guide wire 8 that is constant along the guide wire 8, e.g., based on the measured signal level, what is a simple and effective way to maintain the distance to the guide wire that has been randomly set before.

At step S107, or at any other point prior to step S109, the robotic mower 2 generates a value indicative for a second distance D2, the second distance D2 being a distance between a sensor (sensor 12 or sensor 14) on the robotic mower 2 and a second signal source, which is the charging station loop 10 in this example. The value indicative for the second distance D2 may be based on the random distance value, or on another random value. Further, a signal strength is calculated based on the generated value at step S107 or at some point prior to step S109.

At step S108, the robotic mower 2 detects, by means of the at least one sensor 12, 14, a signal from the second signal source. Here, the second signal source is the charging station loop 10.

Next, at step S109, the robotic mower 2 determines (e.g., detects) the second distance D2 based on the at least one signal from the second signal source, i.e., the robotic mower determines that one of its sensors (sensor 12 or sensor 14) is in the second distance D2 with respect to the second signal source (here, the charging station loop 10). This may comprise detecting a signal from the second signal source having the calculated signal strength or a higher signal strength. The calculated signal strength is based on the determined value indicative for the second distance D2.

At step S110, the robotic mower 2 navigates based on the first distance D1 and the second distance D2. This may comprise determining, by the robotic mower 2, a path based on the first distance D1 and the second distance D2, and moving the robotic mower 2 along the determined path. It is worth noting that, when the robotic mower 2 navigates based on the first distance D1 and the second distance D2, the robotic mower 2 does not follow any signal. For example, the sensors 12, 14 may be switched off, or not listened to, e.g., to save battery life. At step S110, the robotic mower 2 navigates using dead reckoning based on the first distance D1 and the second distance D2. At step S110, the robotic mower 2 moves towards the charging station 11. Optionally, the robotic mower 2 determines the path based on the first distance D1 and the second distance D2 at step S107, at step S108, at step S109, or at any other step prior to step S110.

The method then proceeds to step S111, wherein the robotic mower 2 detects, by means of the at least one sensor 12, 14, a third signal from a third signal source, e.g. the loop 4*a* of the boundary wire 4.

Finally, at step S112, the robotic mower 2 is controlled to follow the third signal to dock the robotic mower 2 at the charging station 11, e.g., by electrically contacting charging connectors of the charging station 11.

It is worth noting that the robotic mower 2 may be guided to the predetermined position more than once. In particular, the steps S100 through S112 (or a subset of these steps) are repeated each time when the robotic mower 2 returns to the charging station 11, or, more generally, when driving to a predetermined position.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

LIST OF REFERENCE NUMERALS

2 robotic mower
4 boundary wire
4*a* boundary wire loop
6 signal generator
8 guide wire
8*a* straight section
8*b* section
10 charging station loop
11 charging station 12 sensor
14 sensor
16 charging connector
18 battery
20 wheel
22 control unit
24 charging station plate
26 charging connector
60 processor
62 memory
64 computer program
80 processor
82 memory
84 computer program
A area

The invention claimed is:

1. A method for navigating a robotic mower having at least one sensor, the method comprising:
    detecting, by the at least one sensor, at least one signal from a guide wire as a first signal source, wherein the guide wire is a guide wire arranged within an area delimited by a boundary wire;
    controlling the robotic mower to align with the guide wire, wherein, controlling the robotic mower to align with the guide wire comprises controlling the robotic mower to follow the guide wire in a first direction until detecting a straight section of the guide wire, and, in response to detecting the straight section of the guide wire, controlling the robotic mower to follow the guide wire in a second direction opposite the first direction;
    controlling the robotic mower to turn by an angle with respect to a section of the guide wire,
    controlling the robotic mower to increase a distance between the robotic mower and the guide wire by driving a displacement distance based on a random distance value, and
    measuring, by the at least one sensor, a signal level of the at least one signal from the guide wire;
    controlling the robotic mower to follow the guide wire at a first distance to the guide wire according to the signal level;
    generating a value indicative for a second distance;
    detecting, by the at least one sensor, at least one signal from a second signal source;
    detecting a second distance based on the at least one signal from the second signal source; and
    navigating the robotic mower along a path determined based on the first distance and the second distance;
    wherein the first distance is a random corridor distance calculated based on a random number, the robotic mower is adapted to search for the straight section of the guide wire having a length, the length is based on the same random number configured to calculate the random corridor distance.

2. The method according to claim 1, further comprising, prior to navigating the robotic mower along the path determined based on the first distance and the second distance, determining the path based on the first distance and the second distance.

3. The method according to claim 2, wherein, when navigating the robotic mower along the path determined based on the first distance and the second distance, the robotic mower is navigated without following any signal.

4. The method according to claim 3, wherein navigating the robotic mower along the path determined based on the first distance and the second distance comprises dead reckoning based on the first distance and the second distance.

5. The method according to claim 4, wherein the first distance is based on a random value.

6. The method according to claim 5, wherein the second distance is based on a random value.

7. The method according to claim 6, wherein the first distance and the second distance are measured orthogonal to each other.

8. The method according to claim 7, wherein navigating the robotic mower based on the first distance and the second distance comprises controlling the robotic mower to move towards a charging station.

9. The method according to claim 8, wherein the wire comprises a section being routed around the charging station.

10. The method according to claim 9, wherein the second signal source is a charging station loop arranged at the charging station.

11. The method according to claim 10, further comprising:
    detecting, by the at least one sensor, at least one signal from a third signal source; and
    controlling the robotic mower to dock at a charging station based on the detected at least one signal from the third signal source.

12. The method according to claim 11, wherein the third signal source is a boundary wire loop of the boundary wire.

13. The method according to claim 12, wherein the boundary wire loop comprises two parallel wire sections.

14. The method according to claim 13, wherein the boundary wire loop is arranged at a charging station plate of the charging station.

15. The method according to claim 14,
    wherein a signal strength is calculated based on the generated value, and detecting the second distance based on the at least one signal from the second signal source comprises detecting, by the at least one sensor, at least one signal from the second signal source having at least the calculated signal strength.

16. A robotic mower (2), navigated based on the method according to claim 1 and comprising at least one sensor, and adapted to:
    detect, by the at least one sensor, at least one signal from the guide wire as the first signal source;
    follow the guide wire at a first distance to the guide wire;
    detect, by the at least one sensor, at least one signal from the second signal source;
    detect the second distance based on at least one signal from the second signal source; and
    navigate along the path determined based on the first distance and the second distance.

17. The method according to claim 1, wherein, the second distance is randomized or determined as equal to the first distance times a predetermined factor, the first distance and the second distance is configured to determine a distance and a turning angle of the robotic mower to a center front of charging station, and when driving by dead reckoning, the robotic mower uses odometry to determine how many degrees the robotic mower has turned or how far the robotic mower has driven.

18. The method according to claim 17, wherein, a dead reckoning path is determined through using a law of cosines to calculate the turning angle towards the charging station, and the robotic mower then turns by the turning angle and then drives straight forward until the charging station is reached.

19. The method according to claim 17, wherein, a dead reckoning path is determined by driving in a S-shape towards the charging station, the dead reckoning path is capable of being done by driving in two different arcs, a first arc is defined by a first angle in a third direction with a certain radius, when the robotic mower has turned by the first angle, a second arc is defined by a second angle in a fourth direction with the certain radius, the third is along a left or right direction, the fourth direction is opposite to the third direction, the certain radius is a distance based on the second distance; and after driving the second arc, the robotic mower drives straight until the charging station is reached.

\* \* \* \* \*